Jan. 31, 1956  G. ANDREOLI ET AL  2,732,886
METHOD FOR PRODUCING CORRUGATED ROOFING MATERIAL
Filed April 13, 1953  2 Sheets-Sheet 1

INVENTORS.
Giulio Andreoli
Alberto Andreoli
BY
James H. Littlepage
ATTORNEY.

INVENTORS.
Giulio Andreoli
Alberto Andreoli
BY
ATTORNEY.

United States Patent Office 2,732,886
Patented Jan. 31, 1956

2,732,886
METHOD FOR PRODUCING CORRUGATED ROOFING MATERIAL

Giulio Andreoli and Alberto Andreoli, Rome, Italy

Application April 13, 1953, Serial No. 348,376

1 Claim. (Cl. 154—30)

This invention relates to corrugated laminated sheet material and, more particularly, to corrugated lamina of metal foil on a relatively heavy base material and binder.

One object of the invention is to provide for the continuous production of corrugated material consisting of lamina of foil and base material as a continuous ribbon, wherein the corrugating and laminating steps are accomplished simultaneously. Heretofore, when analogous materials have been produced in separate steps, i. e., by first laminating a flat metallic foil on a base material and subsequently corrugating the laminated composite, the product was not only inordinately expensive, but also certain difficulties which deleteriously affected the product were inherent. The foil was subject to undue stretching, and the differences in material characteristics presented the tendency of the foil to pull away from the surface of the base material so that when the resultant product was used for roofing or sheathing, the bond was non-uniform and the foil tended to tear, crawl or creep. With these and other problems in mind, it is intended now to provide a method of producing a laminated corrugated material wherein a metallic foil, such as aluminum foil, is bonded to a heat softenable base material, such as asphalt impregnated cardboard or felt by a thermoplastic binder such as asphalt or bitumen. The method includes the steps of first coating a moving flat ribbon of the base material with the hot plastic binder, bringing a similarly moving rough surface ribbon of foil in face engagement over the plastic binder, corrugating and tightly pressing together the combined base material, binder and foil while the binder is still hot and plastic, and supporting the composite material on an undulated surface until the heat from the binder is dissipated so that the material will thereafter retain its corrugated form in handling and use.

In the process, the undulated support of the corrugated material while the binder is cooling is of particular importance because the binder, while hot, softens the base material so that the hot composite would otherwise resume its original flat form. Another object in the method is that the cooling ribbon of laminated material be supported with the metallic foil lamina freely exposed to the atmosphere so that it acts as an extended surface heat radiator, thereby dissipating the heat from the binder and base material as rapidly as possible.

As a further feature of the heat dissipating concept of the method, another object is to utilize a rough foil characterized by small concavo-convex embossures over the entire surfaces thereof so as to extend the radiating surface thereof while the composite material is cooling immediately after the combined bonding and corrugating step, and also to increase the bonding surface of the foil adjacent the binder.

An important object of the invention is the provision of apparatus for coating one side of a running ribbon of base material, bringing a moving ribbon of metallic foil preliminarily in flat face engagement over the binder so as to sandwich the latter between the base material and the foil, then simultaneously bonding and corrugating the composite material in a continuous press including a cooperating pair of upper and lower slatted belt runs, and then transporting the bonded and corrugated composite from the press to a remote cut-off station on the undulations of the lower slatted belt run only so as to expose the extended heat radiating surfaces of the metallic foil to the atmosphere while supporting the composite against deformation while it cools.

An object relating to the product is the provision of a corrugated laminated composite relatively rigid corrugated material including a felt cardboard base, a top lamination of aluminum foil characterized by small concavo-convex embossures distributed over substantially the entire foil, and an intermediate normally hard thermoplastic binding layer permeating and impregnating the base and being in complementary tight surface engagement with the underside of the embossed foil. The more specific objects of the foil and binder relationship are to extend the reflective and heat radiating surface of the foil, to increase the area of surface contact with the binder, and to provide a tight mechanical engagement between the foil and binder so as to preclude peeling off the foil and creeping of the foil relative to the base and binder, the normally hard thermoplastic binder is utilized also to maintain the composite material in corrugated condition.

These and other objects will be apparent from the following specification and drawing, in which:

Figs. 1 and 1A are a side elevation of the apparatus, illustrating one made for carrying out the process;

Figure 1:
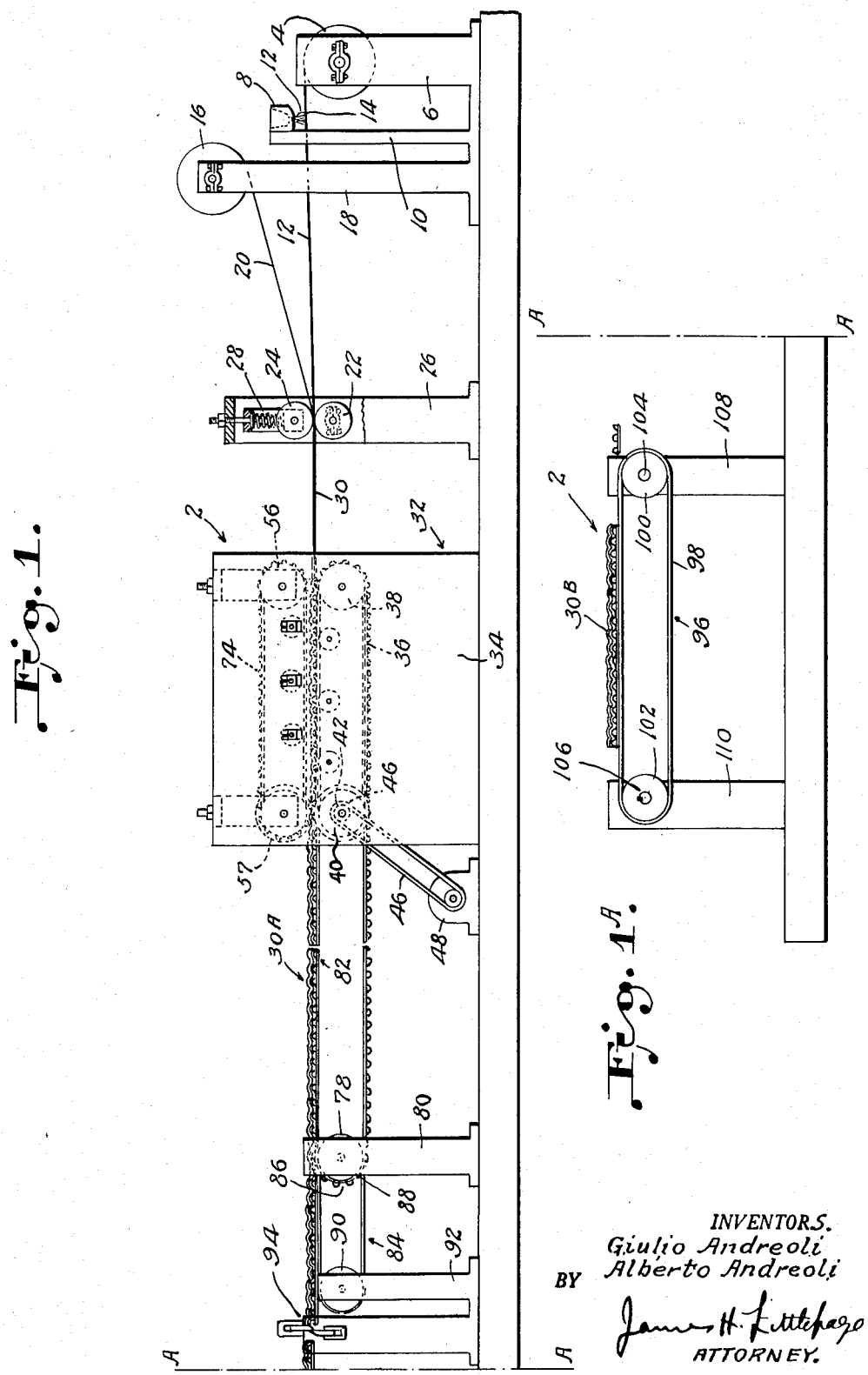

Referring now to the drawings in which like elements denote similar numerals, the apparatus denoted generally at 2 starts with a supply roll 4 for the base material. The base material is a bitumen impregnated felt of the general type heretofore used for siding as roofing material, of stiff but rollable characteristics. Supply roll 4 is rotatably supported on a stanchion 6 adjacent a spreader trough 8 suitably supported as indicated at 10. In the preferred embodiment a hot thermoplastic binder 12 composed of a paste of oxidized asphaltic bitumen and filler fibers is deposited over the surface of the ribbon 14 of base material as the latter emerges from supply roll 4. The hot asphalt is supplied from a suitable conventional heating source, it being understood that this binder is characterized by its plasticity and fluidity when heated, and by its comparative hardness and stiffness when cooled to normal temperature within range of those encountered at the roof or the side of a building exterior.

As ribbon 14 of the base material moves to the left from the supply roll as seen in Fig. 1, it carries across its upper surface the still hot asphalt 12, this latter material being suitably spread by doctors, as is well known in the art, or by hand tools. Supported above asphalt ribbon is a foil supply roll 16 rotatably mounted on a suitable stanchion 18 so that a ribbon 20 of aluminum foil passes downwardly therefrom towards the hot asphalt layer on the ribbon of base material. While the aluminum foil forming ribbon 20 is generally flat, it is also characterized by a dimpled surface of concavo-convex indentations and projections throughout its entire surface which give it a roughened appearance and texture for reasons detailed hereinafter. Ribbon 14 of base material, with hot asphalt 12 across its upper surface is preliminarily lightly pressed against the lower surface of foil ribbon 20 between pressure rollers 22 and 24 rotatably supported on a stanchion 26. The upper pressure roller 24 is spring pressed towards lower roller 22 by an adjustable spring presser 28, the latter being well known in the art so that the compression exerted by the rollers 22 and 24 may be adjusted. One or the rollers, such as roller 22, may be positively driven by a suitable source of power (not illustrated) if desired.

Figure 2:
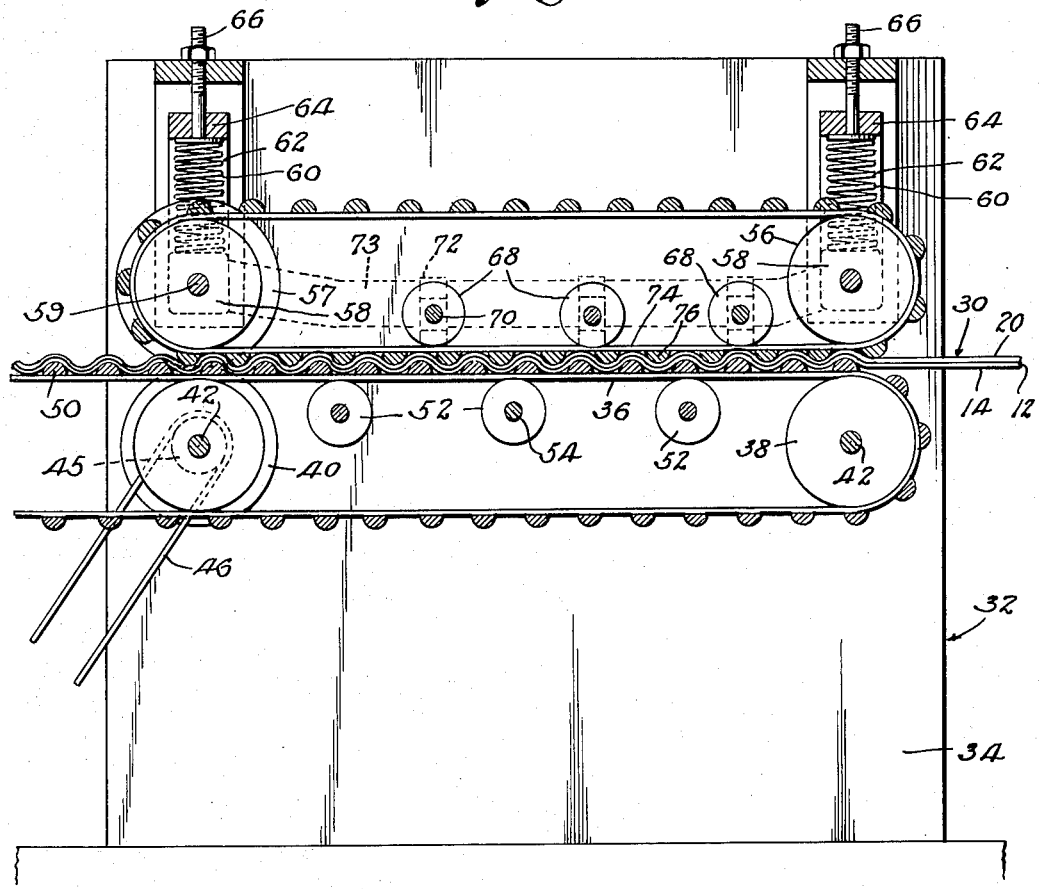
Fig. 2 is an enlargement of the continuous corrugating and bonding press illustrated in Fig. 1; and, Fig. 3 is an isometric view, showing one edge in section, of the composite product.

From preliminary rollers 22 and 24, the composite ribbon 30 passes to a combined corrugating and binding press indicated generally at 32. Since most of the elements of press 32 are well known to those skilled in the art, it should suffice to recite that the press includes a frame 34 in which a lower belt 36, extending from side to side therein is rotatably supported on a pair of main support rollers 38 and 40. Roller 38 is supported for rotation about a fixed horizontal axis by roller shafts 42, the ends of which are suitably supported in bearings (not shown), on frame 34 and roller 40 is similarly supported by a transverse shaft 42 having its ends suitably supported in fixed bearings in the sides of frame 34. Roller 40 is driven in a counter-clockwise direction as seen in Figs. 1 and 2 by a sheave 45 affixed on axle 42, the latter being driven through belt 46 by a motor 48. Slats 50 affixed on and extending transversely of lower belt 36 provide the lower part of the corrugating elements during the pressing and corrugating phase of the operation and subsequently provide the undulated support for the coiling corrugated material as it emerges from press 32. Belt 36 is further supported between support rollers 38 and 40 by auxiliary support roll 52, the shafts 54 of which are suitably supported in bearings at their ends on frame 34.

Rotatably mounted in frame 34 above support rollers 38 and 40 are a pair of pressure rollers 56 and 57. Since these pressure rollers are similar only one will be described. Roller 57 has its shaft 59 rotatably supported at its ends in bearing blocks 58 and the latter are vertically slidable in slat-ways 60 in frame 34. Bearing blocks 58 sliding in vertical guideways 60 are resiliently pressed downwardly by springs 62 under downward compression by block 64 at its upper end, the latter being vertically adjusted by a conventional screw mechanism as shown at 66. Between pressure rollers 56 and 57 are a series of auxiliary pressure rollers 68, the shafts 70 of the latter being rotatably supported at their ends in bearing blocks 72, they being supported as a gang by bars 73 which extend between bearing blocks 58 so that the downward pressure of the entire upper system may be varied by adjustment of the screw mechanisms 66. A pressure belt 74 rolling over pressure rollers 56 and 57 is provided on its exterior with transverse slats 76 which inter-fit between slats 50 on roller belt 36 so that when the composite ribbon 30 is corrugated the laminae are pressed tightly together to establish a tight bond. The still plastic asphalt binder 12 is pressed into the base material 14 and, being hot, renders the latter limp and pliable, and the asphalt binder is formed on its upper surface with dimples and concavities complementary with the dimples in the surface of the foil, the latter serving as a mold for the still plastic binder.

Upon leaving press 32, the corrugated composite ribbon indicated at 30A is transported from the press on an open part of the run indicated generally at 82 of lower belt 36. The end of the open run of the belt is rotatably supported on a roller 78 rotating between stanchions 80 spaced from press 32. During its transportation on the open part 82 of the undulated supporting belt, the composite ribbon 30A rapidly cools as a result of the heat dissipation through and by the dimpled foil which constitutes the uppermost lamina. The dimpled and corrugated aluminum lamina functions as an extended surface to promote the loss of heat through the highly conductive aluminum material from the binder sandwiched between the foil and base lamina so that the binder and base material are sufficiently cool at the end of the open run 82 of the supporting belt as to be hard and self supporting against flattening deformation, in contrast with the condition at the point of departure from press 32 wherein the corrugated ribbon were it not supported on the undulated surface of the belt would tend to resume its previous flat condition.

After leaving the open run 82 of the supporting belt, ribbon 30A is transported on a skeleton belt indicated generally at 84 and including laterally spaced cables 86 extending around pulley wheels 88 and 90. Pulley wheel 88 is supported on and rotates with roller 78 and pulley wheels 90 are rotatably supported on stanchions 92. The skeleton belt 86, being open, promotes further cooling of the underside of the base lamina so that by the time ribbon 30A reaches shear 94 it is ready for cutting into lengths suitable for siding or roofing.

As indicated in Fig. 1A after ribbon 30A is sheared into suitable lengths, the sheared lengths 30B thereof are passed to a skeleton belt 96 for final cooling and unloading. Skeleton belt 96 includes a pair of cables 98 passing around pulley wheels 100 and 102, the latter being rotatably supported on shafts 104 and 106 respectively extending between stanchions 108 and 110. Suitable unloading mechanism might be provided in accordance with common practices in the art.

Figure 3:
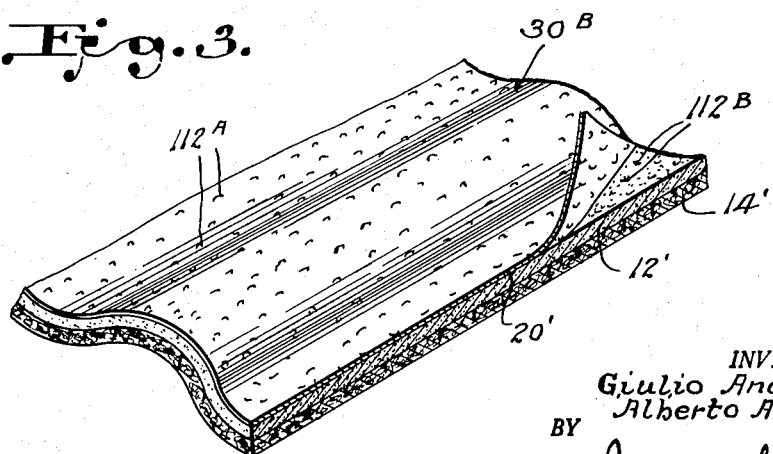

As illustrated in Fig. 3, the product 30B is a sheet of corrugated roofing material formed of relatively thick felted fibers 14' saturated with a relatively hard asphalt binder 12', the latter forming an intermediate layer on the upper side of the base material. The upper surface of intermediate layer 12' is dimpled as indicated at 112A, complementarily with the lower surface of the uppermost layer 20' of aluminum foil. The small dimpled concaves and convexes 112B of foil 20' mate with the dimpled surfaces 112A of the intermediate binder layer 12' so as to form a tight mechanical bond therewith, thereby militating against any tendency of foil 20' to creep or move laterally with respect to the intermediate and bottom layers 12' and 14'. This characteristic is of particular value when the material is subjected to sufficient heat as to soften the binder 12'. From the broken-away section of Fig. 3, it will be apparent that the dimples 112B of foil layer 20' extend the radiating and reflective surface of the foil, and the latter being in continuous face engagement with the binder layer 12' serves to dissipate the heat rapidly. In an embodiment of the invention, wherein the base layer 14' was composed of impregnated bitumen felt made with a mixture of animal fibers, the intermediate binder layer 12' composed of a paste of oxidized asphaltic bitumen and fillers, and the top layer 20' composed of aluminum foil of approximately 0.06 millimeter thickness, it was found that the sheets 30B of roofing material would withstand a uniformly distributed weight in excess of 205 pounds per square foot in a typical roof installation, and would withstand temperatures far in excess of those encountered in roof installations, even in tropical countries without damage to or deformation of the material. The material has heat insulating properties far in excess of aluminum or galvanized roofing and has reflective and water shedding properties far in excess of tar paper or tar felt roofing, and with much greater ability to withstand heat and weather.

The invention detailed above is not limited to the specific details but is intended to cover all substitutions, modifications and equivalents within the scope of the following claim.

We claim:

The method of producing corrugated laminated sheet material, which comprises; applying hot thermoplastic asphalt binder which is hard at room temperature to the upper surface of a flat strip of flexible felt as the felt moves horizontally from a supply roll; applying a substantially flat continuous strip of flexible metal foil on top of the hot applied asphalt while pressing the strips towards one another between smooth cylindrical rolling surfaces, thereby permeating the felt with the hot asphalt and spreading the hot asphalt uniformly between the strips so as to form an impressionable continuous composite strip; transporting the composite strip away from the cylindrical rolling surfaces on the upper run of a corrugated belt-shaped surface, moving lengthwise of the composite strip; confining the composite strip on the belt-shaped surface adjacent the cylindrical rolling surfaces as it is transported away from the cylindrical rolling surfaces and simultaneously pressing transverse corrugations in the composite strip; exposing the corrugated composite strip to the atmosphere to cool, on the belt-shaped surface remote from the cylindrical rolling surface as it is transported away from the point of confinement and corrugation, until the binder is relatively hard; and then shearing the strip into predetermined lengths.

References Cited in the file of this patent

UNITED STATES PATENTS

| | | |
|---|---|---|
| 506,745 | Stanley | Oct. 17, 1893 |
| 540,992 | Krause et al. | June 11, 1895 |
| 1,839,200 | Clarke | Jan. 5, 1932 |
| 2,016,429 | Hayden | Oct. 8, 1935 |
| 2,071,360 | Reid | Feb. 23, 1937 |
| 2,091,918 | Fincke | Aug. 31, 1937 |
| 2,290,608 | Evans | July 21, 1942 |

FOREIGN PATENTS

| | | |
|---|---|---|
| 415,739 | Great Britain | Aug. 27, 1934 |
| 831,714 | France | June 13, 1938 |